(12) United States Patent
Gu et al.

(10) Patent No.: US 11,181,799 B2
(45) Date of Patent: Nov. 23, 2021

(54) PIEZO ELECTROPHORETIC DISPLAY

(71) Applicant: E INK CALIFORNIA, LLC, Fremont, CA (US)

(72) Inventors: Haiyan Gu, Fremont, CA (US); HongMei Zang, Fremont, CA (US); Craig Lin, Oakland, CA (US); Abraham Berhane, Tracy, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 186 days.

(21) Appl. No.: 16/415,022

(22) Filed: May 17, 2019

(65) Prior Publication Data

US 2019/0353973 A1    Nov. 21, 2019

Related U.S. Application Data

(60) Provisional application No. 62/673,092, filed on May 17, 2018, provisional application No. 62/727,033, filed on Sep. 5, 2018.

(51) Int. Cl.
*G02F 1/167* (2019.01)
*G02F 1/1676* (2019.01)
*G02F 1/16755* (2019.01)
*G02F 1/1675* (2019.01)

(52) U.S. Cl.
CPC ............ *G02F 1/167* (2013.01); *G02F 1/1676* (2019.01); *G02F 1/16755* (2019.01); *G02F 2001/1678* (2013.01); *G02F 2202/10* (2013.01)

(58) Field of Classification Search
CPC .... G02F 1/16755; G02F 1/167; G02F 1/1676; G02F 2001/1678; G02F 2002/10
See application file for complete search history.

(56) References Cited

U.S. PATENT DOCUMENTS

| | | | |
|---|---|---|---|
| 3,035,200 A * | 5/1962 | Yando | H05B 33/12 313/508 |
| 3,072,821 A * | 1/1963 | Yando | H05B 33/12 315/55 |
| 3,383,993 A | 5/1968 | Yeh | |

(Continued)

FOREIGN PATENT DOCUMENTS

| | | |
|---|---|---|
| JP | 2004165267 A | 6/2004 |
| JP | 2008009110 A | 1/2008 |

(Continued)

OTHER PUBLICATIONS

Korean Intellectual Property Office, PCT/US2019/032805, International Search Report and Written Opinion, dated Sep. 6, 2019. Sep. 6, 2019.

(Continued)

*Primary Examiner* — Christopher Stanford
*Assistant Examiner* — Journey F Sumlar
(74) *Attorney, Agent, or Firm* — Jason P. Colangelo

(57) ABSTRACT

Provided herein is an electro-optic display having a layer of electrophoretic material, a first conductive layer, and a piezoelectric material positioned between the layer of electrophoretic material and the first conductive layer, the piezoelectric material overlaps with a portion of the layer of electrophoretic material, and a portion of the first conductive layer overlaps with the rest of the electrophoretic material.

15 Claims, 24 Drawing Sheets

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,301,038 B1 | 10/2001 | Fitzmaurice et al. | |
| 6,373,461 B1 | 4/2002 | Hasegawa et al. | |
| 6,672,921 B1 | 1/2004 | Liang et al. | |
| 6,704,133 B2 | 3/2004 | Gates et al. | |
| 6,738,050 B2 | 5/2004 | Comiskey et al. | |
| 6,788,449 B2 | 9/2004 | Liang et al. | |
| 6,842,166 B2 | 1/2005 | Hasegawa et al. | |
| 6,866,760 B2 | 3/2005 | Paolini Jr., et al. | |
| 6,870,657 B1 | 3/2005 | Fitzmaurice et al. | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,339,715 B2 | 3/2008 | Webber et al. | |
| 7,408,699 B2 | 8/2008 | Wang et al. | |
| 7,411,719 B2 | 8/2008 | Paolini, Jr. et al. | |
| 7,420,549 B2 | 9/2008 | Jacobson et al. | |
| 7,453,445 B2 | 11/2008 | Amundson | |
| 7,535,624 B2 | 5/2009 | Amundson et al. | |
| 7,561,324 B2 | 7/2009 | Duthaler et al. | |
| 7,616,375 B2 | 11/2009 | Hirai et al. | |
| 7,679,814 B2 | 3/2010 | Paolini, Jr. et al. | |
| 7,715,088 B2 | 5/2010 | Liang et al. | |
| 7,839,564 B2 | 11/2010 | Whitesides et al. | |
| 8,009,348 B2 | 8/2011 | Zehner et al. | |
| 8,177,942 B2 | 5/2012 | Paolini, Jr. et al. | |
| 8,319,759 B2 | 11/2012 | Jacobson et al. | |
| 8,791,909 B2 | 7/2014 | Tsai et al. | |
| 8,896,501 B2 | 11/2014 | Stahl et al. | |
| 9,025,238 B2 | 5/2015 | Chan et al. | |
| 9,279,906 B2 | 3/2016 | Kang | |
| 9,465,261 B2 | 10/2016 | Stahl et al. | |
| 10,203,793 B2 | 2/2019 | Grosse-Puppendahl et al. | |
| 2004/0027327 A1* | 2/2004 | LeCain | G02F 1/167 345/107 |
| 2006/0087479 A1 | 4/2006 | Sakurai et al. | |
| 2008/0043318 A1* | 2/2008 | Whitesides | G02B 5/201 359/296 |
| 2012/0224343 A1* | 9/2012 | Sato | G02F 1/1345 361/760 |
| 2012/0293858 A1 | 11/2012 | Telfer et al. | |
| 2014/0354596 A1* | 12/2014 | Djordjev | G06F 3/0421 345/175 |
| 2015/0362647 A1* | 12/2015 | Tanimoto | G02B 5/30 428/413 |
| 2017/0285828 A1* | 10/2017 | Grosse-Puppendahl | G09G 3/344 |
| 2018/0350309 A1* | 12/2018 | Emelie | G02F 1/16766 |
| 2019/0033576 A1* | 1/2019 | Oster | H01L 41/094 |
| 2019/0198748 A1* | 6/2019 | Behera | H01L 41/094 |

FOREIGN PATENT DOCUMENTS

| | | |
|---|---|---|
| KR | 20070082346 A | 8/2007 |
| KR | 20080094252 A | 10/2008 |
| KR | 20090058995 A | 6/2009 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Wood, D., "An Electrochromic Renaissance?" Information Display, 18(3), (Mar. 24, 2002) Mar. 1, 2002.

Bach, Udo. et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

\* cited by examiner

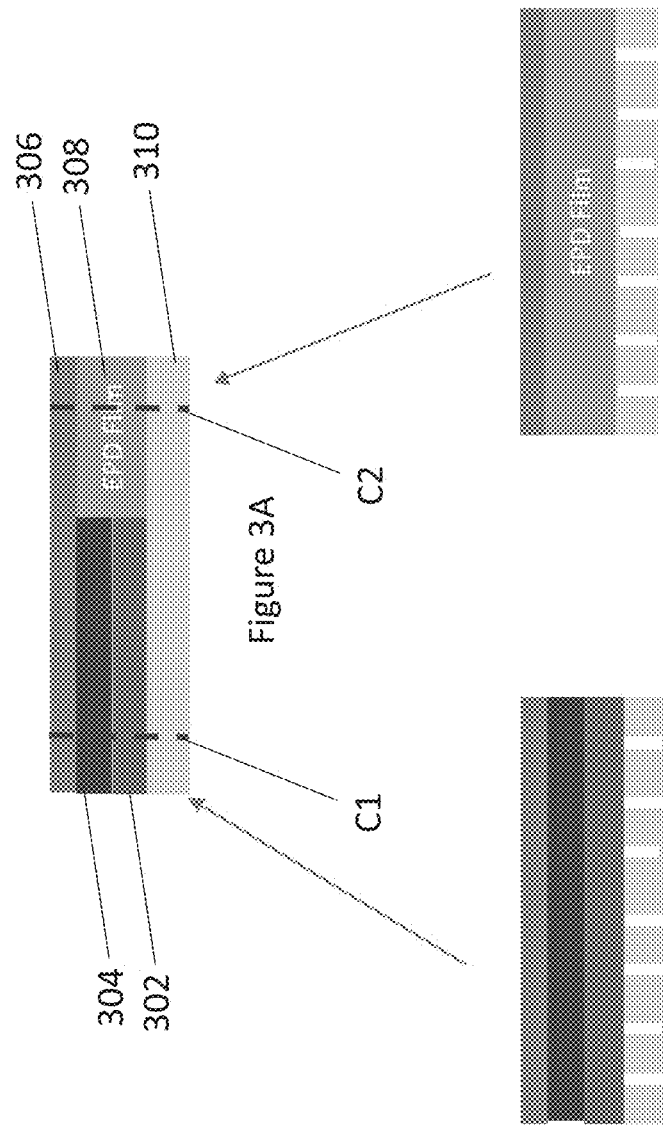

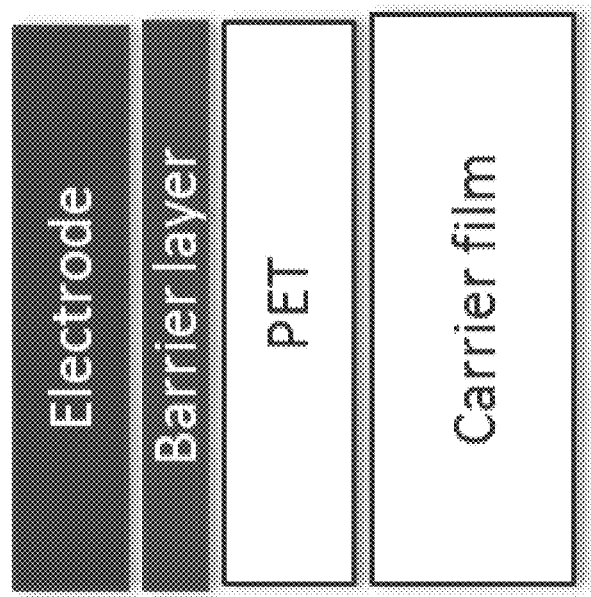

US 11,181,799 B2

PIEZO ELECTROPHORETIC DISPLAY

REFERENCE TO RELATED APPLICATIONS

This application is related and claims priority to U.S. Provisional Application 62/673,092 filed on May 17, 2018. This application is also related to U.S. Provisional Application 62/727,033 filed on Sep. 5, 2018.

The entire disclosures of the aforementioned applications are herein incorporated by reference.

SUBJECT OF THE INVENTION

The subject matter disclosed herein relates to piezo electrophoretic displays which may be activated or driven without being connected to a power source, and methods for their manufacture.

BACKGROUND

Non-emissive displays convey information using contrast differences, which are achieved by varying the reflectance of different frequencies of light; they are thus distinct from traditional emissive displays, which stimulate the eye by emitting light. One type of non-emissive display is an electrophoretic display, which utilizes the phenomenon of electrophoresis to achieve contrast. Electrophoresis refers to movement of charged particles in an applied electric field. When electrophoresis occurs in a liquid, the particles move with a velocity determined primarily by the viscous drag experienced by the particles, their charge, the dielectric properties of the liquid, and the magnitude of the applied field.

An electrophoretic display utilizes charged particles of one color suspended in a dielectric liquid medium of a different color (that is, light reflected by the particles) is absorbed by the liquid. The suspension is housed in a cell located between (or partly defined by) a pair of oppositely disposed electrodes, one of which is transparent. When the electrodes are operated to apply a DC or pulsed field across the medium, the particles migrate toward the electrode of opposite sign. The result is a visually observable color change. In particular, when a sufficient number of the particles reach the transparent electrode, their color dominates the display; if the particles are drawn to the other electrode, however, they are obscured by the color of the liquid medium, which dominates instead.

Many electrophoretic displays are bi-stable: their state persists even after the activating electric field is removed. This is generally achieved via residual charge on the electrodes and van der Waals interactions between the particles and the walls of the electrophoretic cell. The driving of an electrophoretic display requires a power source, such as a battery to provide power to the display and/or its driving circuitry. The power source may be a driver IC in order to generate an electric field. The electric field may also need to be enhanced by a circuitry. In any case, a physical connection through wires is required to attach the power source to the electrophoretic display and its driving circuitry.

SUMMARY

According to one aspect of the subject matter disclosed herein, an electro-optic display may include a layer of electrophoretic material; a first conductive layer; and a piezoelectric material positioned between the layer of electrophoretic material and the first conductive layer, the piezoelectric material overlaps with a portion of the layer of electrophoretic material, and a portion of the first conductive layer overlaps with the rest of the electrophoretic material.

BRIEF DESCRIPTION OF DRAWINGS

FIG. 3A is a cross sectional view of another exemplary display in accordance with the subject matter disclosed herein;

FIG. 3B is a cross sectional view along the line C1 of the display illustrated in FIG. 3A;

FIG. 3C is a cross sectional view along the line C2 of the display illustrated in FIG. 3A;

FIG. 10 is a cross sectional view of a piezoelectric display in accordance with the subject matter disclosed herein having a barrier layer.

DETAILED DESCRIPTION

Figure 1:
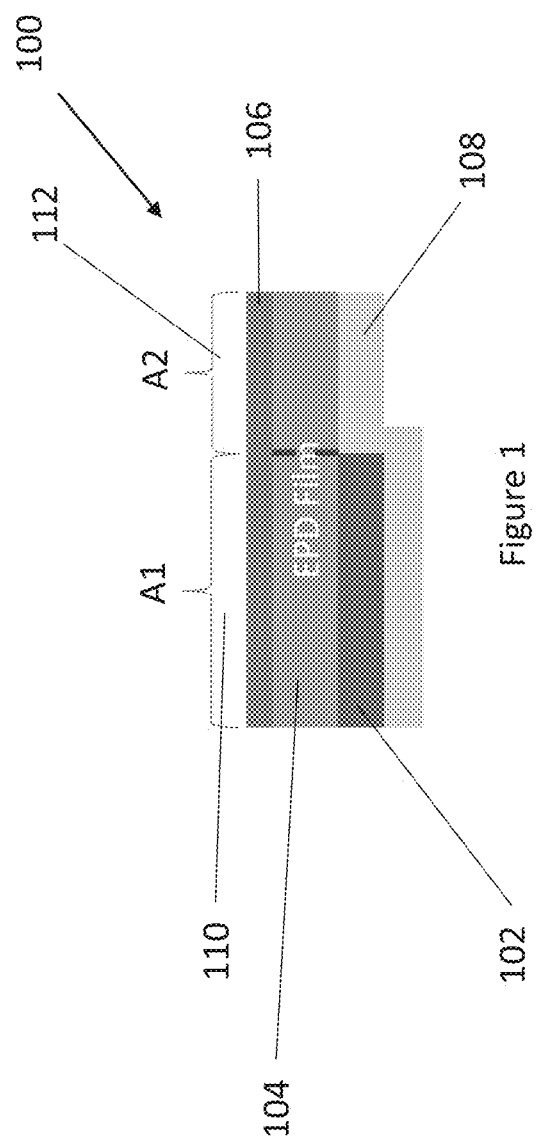
FIG. 1 is a cross sectional view of an exemplary electrophoretic display in accordance with the subject matter disclosed herein.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600 and 7,453,445;
(g) Applications of displays; see for example U.S. Pat. Nos. 7,312,784 and 8,009,348;
(h) Non-electrophoretic displays, as described in U.S. Pat. Nos. 6,241,921; 6,950,220; 7,420,549 and 8,319,759; and U.S. Patent Application Publication No. 2012/0293858;
(i) Microcell structures, wall materials, and methods of forming microcells; see for example U.S. Pat. Nos. 7,072,095 and 9,279,906; and
(j) Methods for filling and sealing microcells; see for example U.S. Pat. Nos. 7,144,942 and 7,715,088.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating, meniscus coating; spin coating; brush coating; air knife coating, silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer, and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The photoelectrophoretic properties of certain pigments were recognized some time ago. For example U.S. Pat. No. 3,383,993 discloses a photoelectrophoretic imaging apparatus that could be used to reproduce projected images on a medium, typically a transparent electrode, such as ITO. The photoelectrophoretic process described in the '993 patent, and other related patents by Xerox Corporation, was not reversible, however, because the photoelectrophoretic process involved the photoelectrophoretic particles migrating to an "injecting electrode" where they would become attached to the electrode. Because of the lack of reversibility, as well as the cost and complication of the setup, this phenomenon was not commercialized widely.

The subject matter presented herein relates to several piezo electrophoretic display structural designs which do not need a power supply (e.g., battery or wired power supply etc.) in order for the electrophoretic display to operate. The assembly of such an electrophoretic display is therefore simplified.

Piezoelectricity is the charge which accumulates in a solid material in response to applied mechanical stress. Suitable materials for the subject matter disclosed herein may include polyvinylidene fluoride (PVDF), quartz ($SiO_2$), berlinite ($AlPO_4$), gallium orthophosphate ($GaPO_4$), tourmaline, barium titanate ($BaTiO_3$), lead zirconate titanate (PZT), zinc oxide (ZnO), aluminum nitride (AlN), lithium tantalite, lanthanum gallium silicate, potassium sodium tartrate and any other known piezo materials.

Some aspects of the subject matter presented herein utilizes the piezoelectricity to drive the pigments of an electrophoretic material, to change the color of the electrophoretic material when viewed from a viewing surface. For example, by bending or introduce stress to a piece of piezo material, voltage may be generated and this voltage can be utilized to cause movement of the color pigments of the electrophoretic material. As used herein, the term "contrast ratio" (CR) for an electro-optic display (e.g., an electrophoretic display) is defined as the ratio of the luminance of the brightest color (white) to that of the darkest color (black) that the display is capable of producing. Normally a high contrast ratio, or CR, is a desired aspect of a display.

Figure 2A:
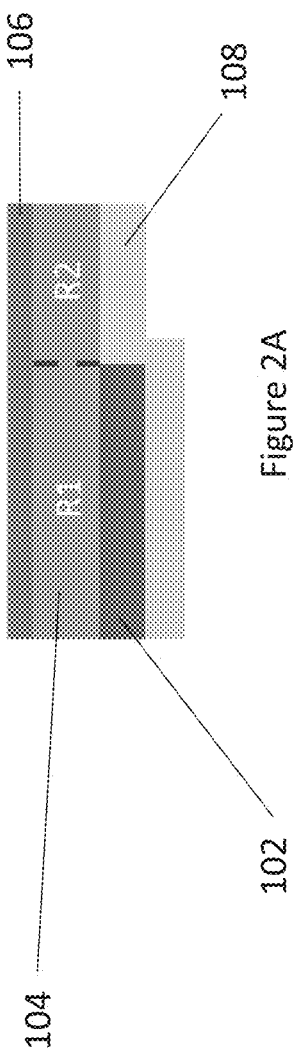
FIG. 2a is another cross sectional view of the display illustrated in FIG. 1.

FIG. 1 illustrates a cross sectional view of an exemplary electro-optic display 100 using a piezo material 102 to drive an electrophoretic material (EPD) film 104 in accordance with the subject matter disclosed herein. In this embodiment, the piezo film 102 may be laminated to a portion of the EPD film 104, and a conductive adhesive material (e.g., copper tape) may be used to cover up the piezo film 102 and the rest of the EPD film 104 as illustrated in FIGS. 1 And 2A. In some embodiments, the conductive adhesive material may function as an electrode 2 108 and be affixed to a substrate (not shown). In some other embodiments, the electrode 2 108 may function as a pixel electrode for modulating a voltage potential across the EPD film 104 for displaying colors or images (e.g., by changing the graytones of the EPD film 104). Furthermore, opposite to the electrode 2 108, an electrode 1 106 may overlap with the EPD film layer 104. In yet another embodiment, the EPD film 104 may be fabricate onto the electrode 1 106 to begin with. For example, electrode 1 106 may firstly be patterned to include micro-cell structures where electrophoretic fluid with electrophoretic particles may be embossed into the micro-cell structure to form an EPD film layer. For which the details will be described in FIGS. 9 and 11A-B below. In this configuration, the EPD film 104 and the electrode 1 106 may be of an integrated structure. In some other embodiments, both the electrode 1 106 and electrode 2 108 may be transparent, or either electrode 1 106 or electrode 2 108 may be transparent, such that display 100 may be viewed from either directions.

In practice, the CR of the electro-optic display 100 may differ depending on the ratio of the EPD film 104 surface area A1 110 (i.e., the portion of EPD film 104 that is overlaps with or covered by or in direct contact with the piezo material 102) compared to that of area A2 112 (i.e., the portion of EPD film 104 that is overlapped with or covered by electrode 2 108), as illustrated in FIG. 1. Experimental result of the CR are shown below in Table 1—

TABLE 1

Display CR vs Piezo Film Surface Area

| Ratio of EPD film on piezo film to that on conductive adhesive | Response of display on strain change |
|---|---|
| 0 | Contrast ratio: 1.7 |
| 1:2 | Contrast ratio: 2 |
| 1:1 | Contrast ratio: 5 |
| 2:1 | Contrast ratio: 7 |

As shown in FIG. 1, a display such as the one illustrated in FIG. 1 may improve its CR by reducing the overall surface area (e.g., A2) of the EPD film 104 that overlaps or is on electrode 2 108 (i.e., conductive adhesive material). The CR improved from 2, when the ratio of EPD film 104 that is on piezo film 102 (e.g., A1) to that is on electrode 2 108 (e.g., A2) is 1:2, to 7 when the ratio became 2:1. In some embodiments, to further improve the CR, the width of either electrode 1 106 or electrode 2 108 may be reduced such that whatever physical stress applied may be applied to the longer side of electrode 2 108 in a vertical direction.

Figure 2B:
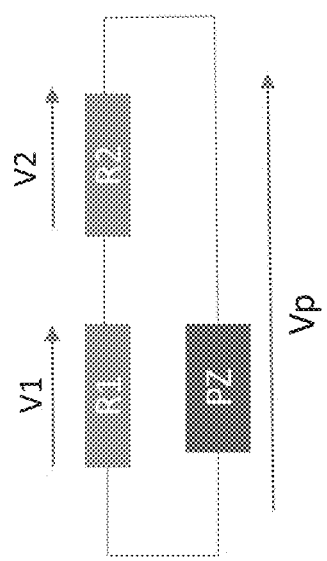
FIG. 2B is an equivalent circuit model of the display illustrated in FIGS. 1 and 2A.

FIG. 2B illustrates an exemplary equivalent circuit of the display 100 shown in FIG. 1 in accordance with the subject matter disclosed herein. Portion of the EPD film 104 in contact with the piezo film 102 may have an electrical resistance value R1 and the portion covered by electrode 2 108 may have an electrical resistance value R2. In practice, voltage generated by the piezo film 104 may be split between R1 and R2 placed in a series configuration. In some embodiments, there may be an adhesive layer between the piezoelectric film 102 and the EPD film layer 104, where the adhesive layer may have a resistivity value of roughly $10^8$ Ohm*cm, and preferably less than $10^{12}$ Ohm*cm.

In another embodiment in accordance with the subject matter disclosed herein, instead of having a piezo film directly laminated onto or overlapping with an EPD film as shown in FIGS. 1 and 2A, a piezo film 302 may be laminated onto a semi-conductive or high-resistive layer 304, and then laminate the semi-conductive or high-resistive layer 304 onto an electrode 1 layer 306, as shown in FIG. 3A. In this configuration, the semi-conductive or high-resistive layer 304 replaces portions of the EPD film 308 on top of the piezo film 302, thereby reducing the overall thickness of the display, as well as preventing a fast dissipation of charges across the piezo film 302 so the locally produced charges (by the piezo film 302) may be effectively and efficiently applied onto the EPD film 308, which results in an improvement in the display CR. Illustrated below in Table 2 is a comparison of the resistivity level of the semi-conductive layer 304 and the resulting CR. As shown, an optimum CR ratio of 12 may be achieved when the semi-conductive layer 304 has a resistivity of $10^8$ Ohm*cm.

TABLE 2

Display CR vs. Resistance

| Resistivity of material in between electrode 1 and piezo film (Ohm*cm) | Response of display on strain change |
|---|---|
| $10^2$ | Contrast ratio: 1.7 |
| $10^8$ | Contrast ratio: 12 |
| >$10^{12}$ | Contrast ratio: 1 (no response) |

Furthermore, display CR may be optimized by adjust the resistance value of the semi-conductive layer 304. For example, at a resistance range of approximately $10^8$ (Ohm*cm), the display CR of 12 may be achieved. In another embodiment, the resistance of the electrode 1 layer 306 may be at approximately 450 ohm/sq, where the resistance of an electrode 2 layer 310 may be at 0.003 ohm/sq, the EPD film 308 may have a resistance of approximately $10^7$ to $10^8$ oh, and the piezo material 302 may have a resistance of $10^{13}$ to $10^{14}$ ohm.

FIGS. 3B and 3C are cross sectional views of the display illustrated in FIG. 3A. FIG. 3B shows the display cross-section along the C1 line and FIG. 3C shows the display cross-section along the C2 line. In practice, only the EPD portion 308 of the display may be made visible to a user, while the piezo film portion may be covered up. As also illustrated in FIGS. 3B and 3C, the electrode 2 layer 310 may be segmented. As a result, the changes in gray tone in the EPD film layer 308 will appear to be segmented as well. Alternatively, if the electrode 2 310 is a single continuous sheet, the change in gray tone in the EPD film layer 308 will be continuous as well. It should be appreciated that both electrode 1 306 and electrode 2 310 may be transparent, and all the layers (e.g., layers 302, 304, 310 etc) may be transparent, such that the display can be viewed from either orientation or directions.

Figure 3D:
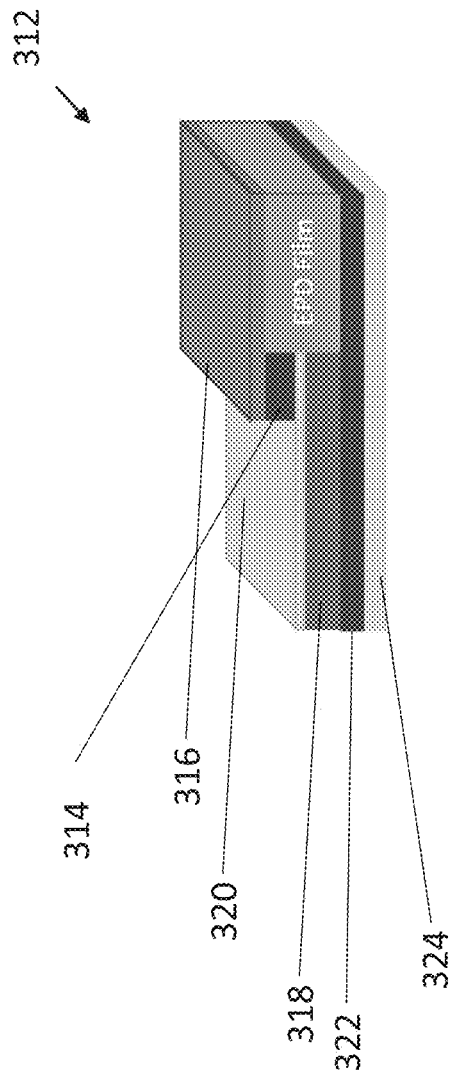
FIG. 3D illustrate yet another embodiment of a display in accordance with the subject matter presented herein.

In another embodiment, FIG. 3D illustrates a cross sectional view of another display 312 in accordance with the subject matter presented herein. This display 312 differs from the display illustrated in FIG. 3A in that only a portion of the piezoelectric film layer 318 overlaps with the electrode 1 316 layer. In this configuration, the piezoelectric film layer 318 can avoid being placed in a neutral plane position, such that better images may be generated from the piezoelectric film 318. In addition, the piezoelectric film layer 318 may be a metalized piezo film and may be covered by a metal layer 320. In some embodiment, a first semi-conductive layer 314 may be positioned between the metal layer 320 and the electrode 1 layer 316. And another second semi-conductive layer 322 may be positioned between the piezoelectric film layer 318 and an electrode 2 layer 324. It should be appreciated that all the layers presented herein, including the electrode 1 316 and electrode 2 324 layers may be transparent, such that this display may be viewed from either direction or orientation.

Figure 4:
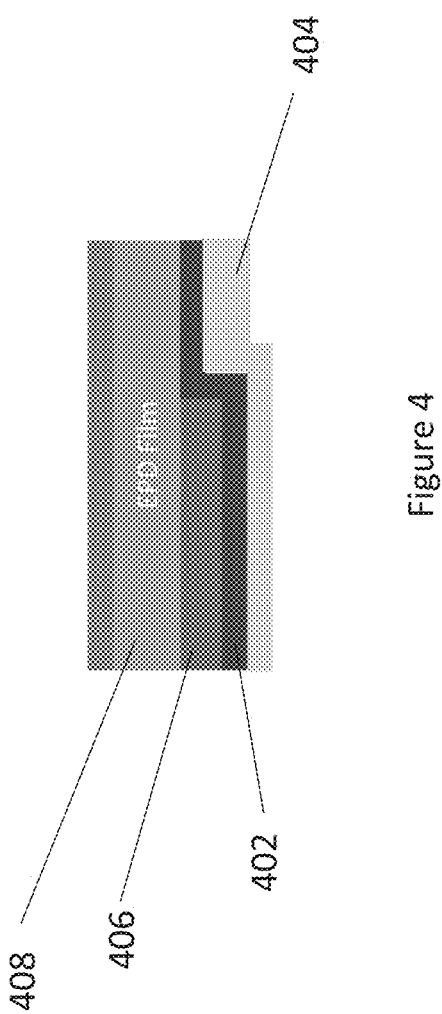
FIG. 4 is a cross sectional view of yet another exemplary display in accordance with the subject matter disclosed herein.

In yet another embodiment, in a configuration similar to that illustrated in FIGS. 1 and 2A, but a semi-conductive layer 402 may be placed between an electrode 2 layer 404 and a piezo film layer 406 and an EPD film layer 408, as shown in FIG. 4. This semi-conductive layer 402 may insulate the piezo film layer 406 and the EPD film layer 408 from electrode 2 404. Similarly, the display illustrated in FIG. 3A may be modified to include an additional semi-conductive layer to insulate the piezo film and the EPD film from electrode 2. Among the various configurations, the display illustrated in FIG. 4 demonstrated the best CR performance at 18. In any case, the display configurations herein enables one to construct a piezo-electricity driven device with a thickness less than 50 um, and also greatly simplifies the device structure and makes the display more sensitive to smaller applied physical stress.

Figure 5:
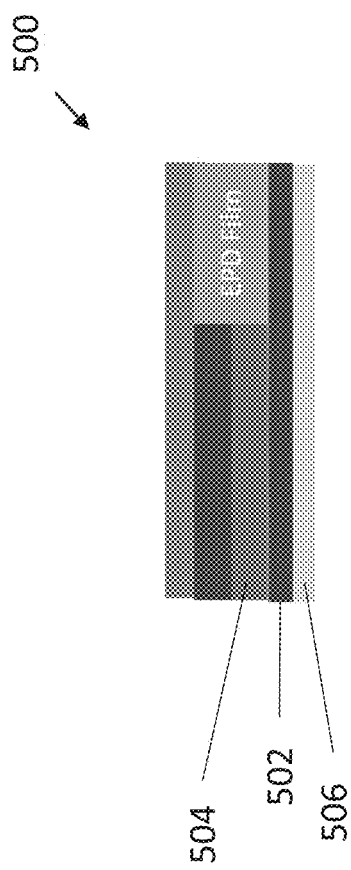
FIG. 5 is a cross section view of another exemplary display in accordance with the subject matter disclosed herein.

FIG. 5 illustrated another design 500 of a display. This display 500 is similar to the one shown in FIG. 3A except an additional semi-conductive layer 502 is placed between the piezoelectric layer 504 and the electrode 2 layer 506. A comparison of the CR ratio between the various designs are illustrated in Table 3 below.

TABLE 3

| Comparative CR | |
|---|---|
| | Response of display on strain change |
| Piezo film directly contact with both electrodes | Contrast Ratio: 1.7 |
| FIG. 1 | Contrast Ratio: 7 |
| FIG. 3A | Contrast Ratio: 12 |
| FIG. 4 | Contrast Ratio: 18 |
| FIG. 5 | Contrast Ratio: 14 |

It should be appreciated that all the layers presented in FIGS. 4 and 5, including the electrode 1 and electrode 2 layers may be transparent, such that these displays may be viewed from either direction or orientation.

It should also be noted that, referring to the display configurations illustrated in FIGS. 1-5, a conductive path is complete between the electrode 1 and electrode 2 and the piezoelectric material layer and the EPD film layer, no other conductor or electrodes is needed between the electrode 1 and electrode 2. This effectively reduces the overall thickness of the device, as well as improves the CR ratio of the display.

Figure 6:
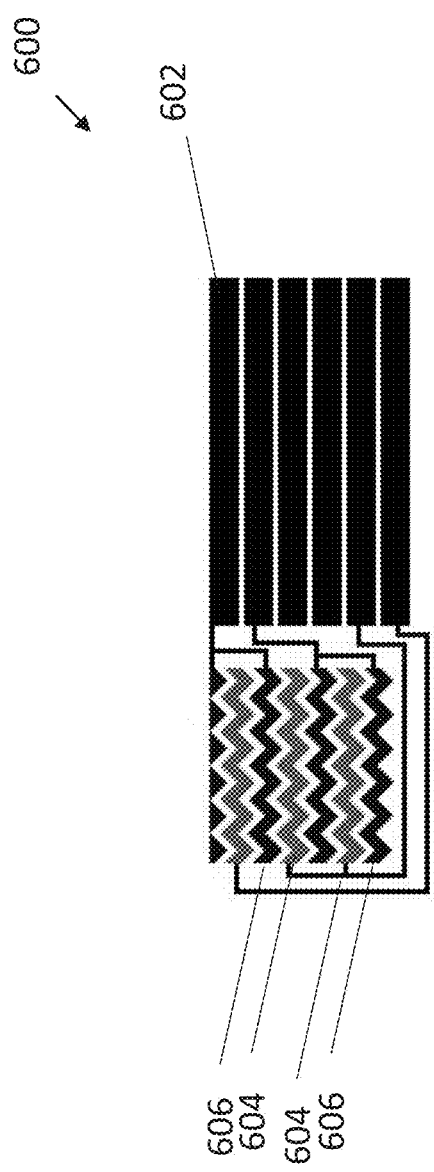
FIG. 6 illustrates one embodiment of a piezo electrophoretic display with a jigsaw pattern in accordance with the subject matter disclosed herein.
Figure 7:
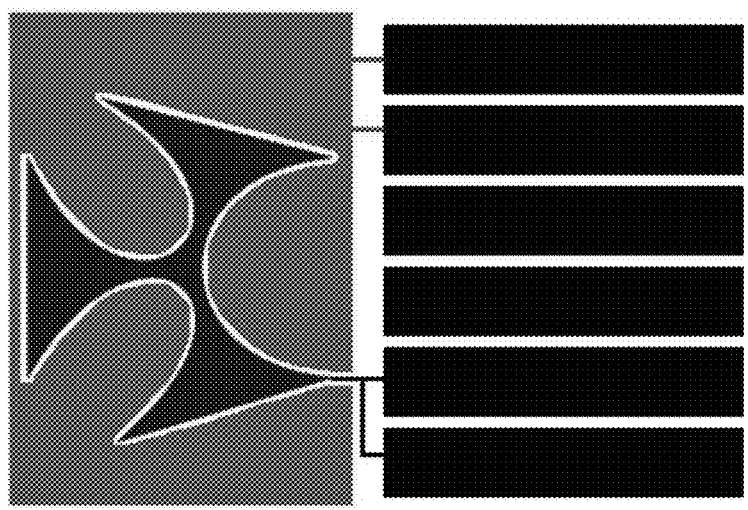
FIG. 7 illustrates yet another embodiment of a piezo electrophoretic display having a pattern in accordance with the subject matter disclosed herein.

FIGS. 6 and 7 illustrate embodiments of piezo electrophoretic displays that may be configured to display various patterns, such as the jigsaw pattern in FIG. 6 and the star shaped pattern in FIG. 7. In FIG. 6, a display 600 may include a plurality of electrodes 602 design to transport charges to electrophoretic display mediums 604s and 606s. In the embodiment illustrated in FIG. 6, the display medium 604 is of red color and the display medium 606 is of black color. It should be appreciated that other colors may be conveniently adopted. In this configuration, electrodes 602 on the top portion of the display may be connected to the black colored display mediums 606, and the electrodes 602 of the bottom portion may be connected to the red colored display mediums 604. In use, when a force is being applied to the display 600, the display mediums 606 and 604 may display both the black and red color. This particular configuration illustrated in FIG. 6 can be printed using conductive material, greatly simplify the manufacturing process.

Figure 8:
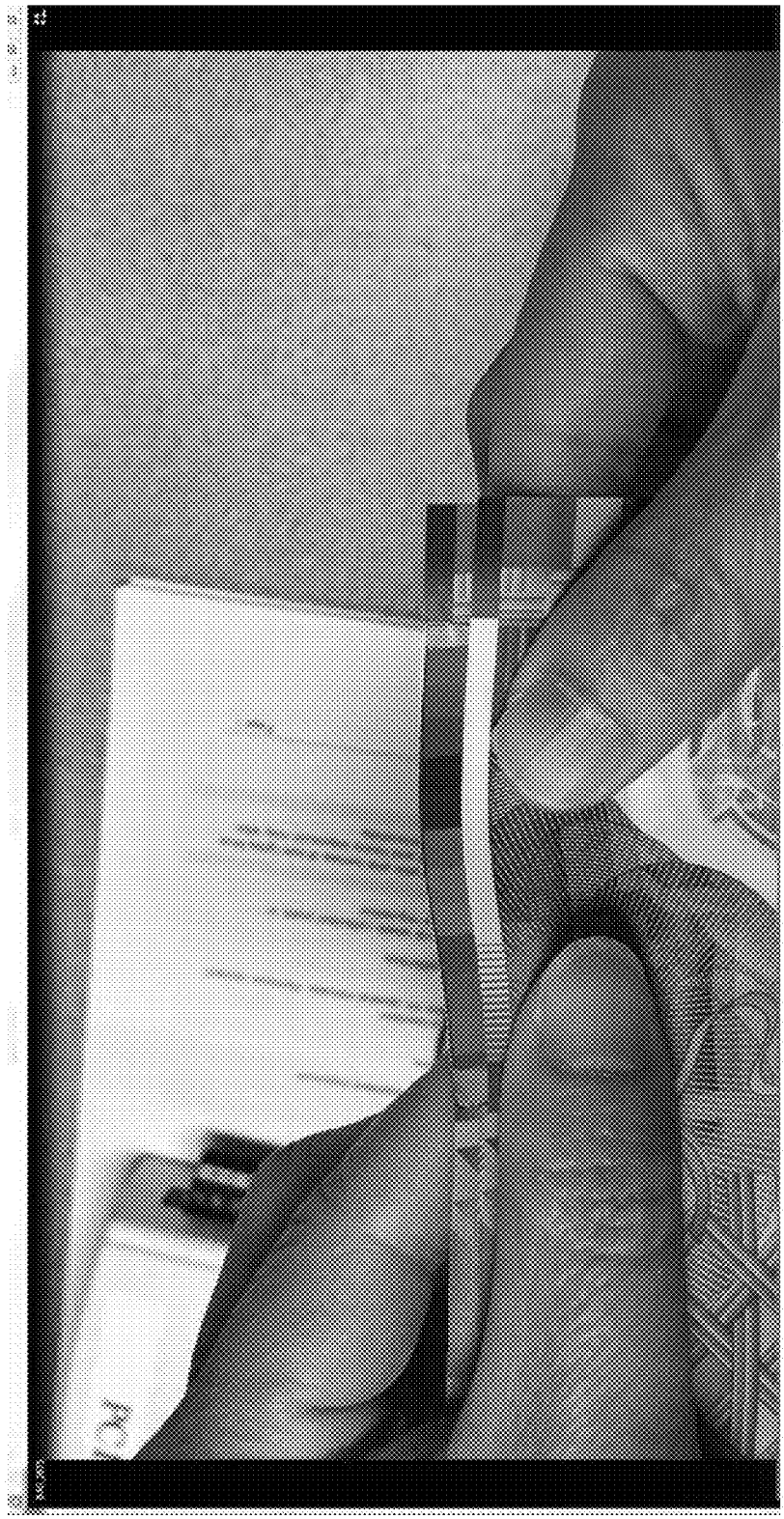
FIG. 8 illustrates a piezo electrophoretic display in accordance with the subject matter disclosed herein being used as part of a currency bill for anti-counterfeiting purposes.

In some other embodiments, a piezo electrophoretic display in accordance with the subject matter disclosed herein may be combined with another apparatus, such as a currency bill illustrated in FIG. 8. In this embodiment, a display may be affixed to one end of a bill, and when physical stress is applied, the display can switch between one or more graytones. In this fashion, a user may easily distinguish a genuine bill from a counterfeiting one. As mentioned above, the electrodes for the display may be segmented, and the resulting gray tone of the EPD material layer may appeal segmented. Alternatively, the electrodes for the display may be a continuous sheet, and the resulting gray tone of the EPD material may vary in a continuous fashion.

Methods of Manufacturing

Figure 9:
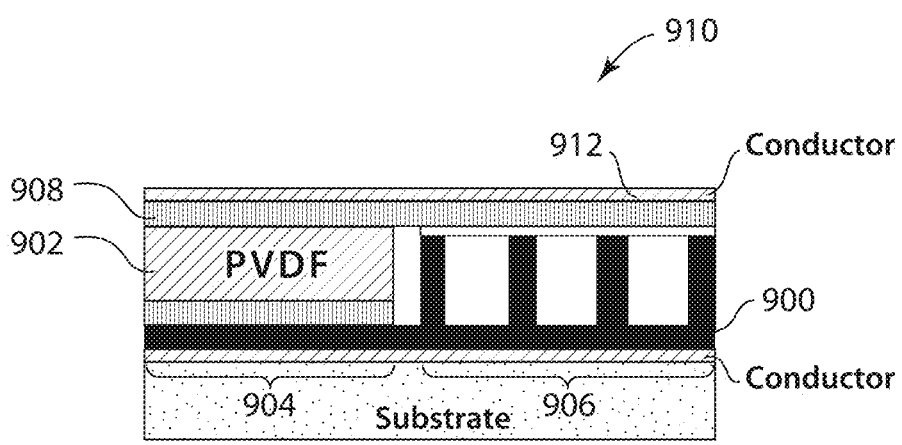
FIG. 9 illustrate a cross section of yet another embodiment of a piezoelectric display in accordance with the subject matter disclosed herein.

FIG. 9 illustrates a cross sectional view of yet another embodiment of a piezoelectric display 910 in accordance with the subject matter presented herein. As shown in FIG. 9, the EPD layer 900 may partially extend underneath a piezo-electric material 902 to substantially overlap and ensuring a secured connection with the piezo-electric material 902. In this embodiment, the EPD layer 900 may have one portion having micro-cells 906 and another portion that is substantially flat 904 and configured for establishing a connection with the piezoelectric material 902. In this configuration, the piezo-electric material 902 is positioned to overlap on the substantially flat portion 904, ensuring a good connection with the EPD layer 900. This configuration can advantageously establish a strong connection between the piezo-electric material 902 and the EPD layer 900. For example, this configuration offers a robust connection between the piezo-electric material 902 and the EPD layer 900 that is capable of withstanding repeated bending or applied stress onto the display device 910. Additionally, an adhesive layer 908 may be placed between the piezoelectric material layer 902 and the conductor 912. In another embodiment, the piezoelectric material 902 can be circular in shape and surrounds the EPD material 900. Furthermore, as illustrated in FIG. 9, the piezo-electric material 902 and the EPD layer 900 may be sandwiched between two layers of conductors or conducting materials, and all the above mentioned layers and material may be positioned on a substrate that can be flexible. It is preferred that the substrate be less than 10 micron in thickness to make the overall device thin. In some embodiments, ITO/PET may be used herein as substrate. In some other embodiments, flexible and transparent conductive coatings may be used, such as PEDOT:PSS, graphene, carbon nanotubes or silver nano wires. In yet some other embodiments, a barrier layer may be sputtered onto the substrate layer (e.g., PET) before coating the conductive layer to provide a barrier to the ink solvent, as shown in FIG. 10. In some cases, this barrier layer may be SiOx. Since the substrate in this case is thin, the barrier layer may also be coated onto the other side of the substrate. Additionally, other optical layers may be printed onto the substrate for decoration purposes. In some embodiments, the carrier film may be discarded after the display have been assembled. And the rest of the display, without the carrier film, may be integrated with other structures. It should be appreciated that all the layers presented herein, including the electrode 1 and electrode 2 layers may be transparent, such that this display may be viewed from either direction or orientation.

Figure 11A:
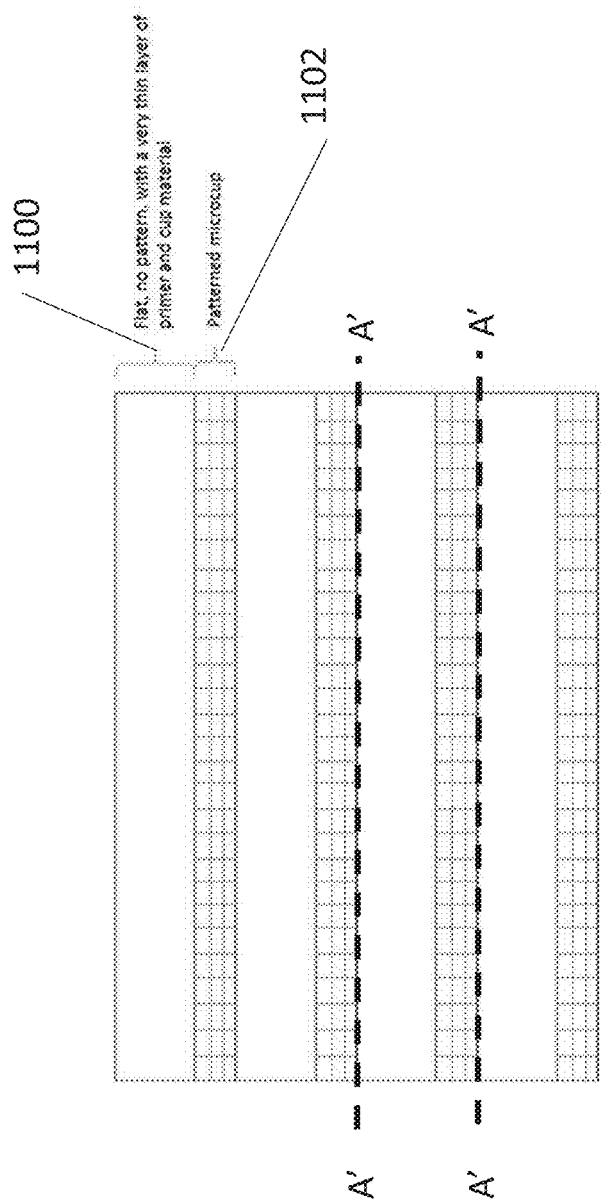
FIG. 11A is a top view of a micro-cell layer.
Figure 11B:
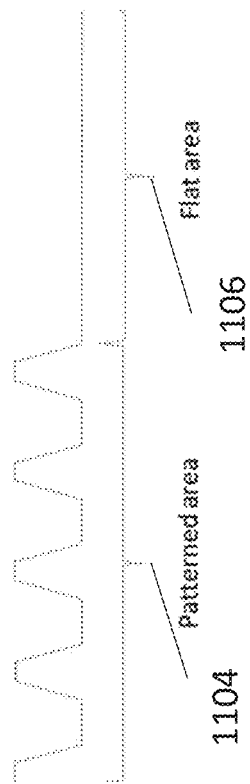
FIG. 11B is a cross sectional view of the micro-cell layer illustrated in FIG. 10A.

FIG. 11A illustrates a top view of the EPD layer 900 of FIG. 9. As shown, the EPD layer 900 may be manufactured by pattern micro-cell structures onto only portions of the layer 900, while leaving the other portion substantially flat. In this fashion, the substantially flat portions 1102 without the micro-cells (i.e., a separate portion 1102 is designated to have microcell structures) may be used to create connections with the piezo-electric layer as shown in FIG. 9. This method of manufacturing offers several advantages. Firstly, it is easier to fabricate the EPD layer in this fashion, where the contacting portion (i.e., the substantially flat portion) and the micro-cell portion 1102 are fabricated at the same time, compared to an alternative method where the fabrication of the two portions are done separately. Secondly, as the substantially flat contact portion 1100 and the micro-cell portion 1102 are fabricated together, they are more robust structurally, which leads to a better connection between the EPD layer and the piezo-electric layer, as well as a more durable display device. FIG. 11B illustrates a cross sectional view of the EPD layer as shown in FIG. 11A. The EPD layer may include a first portion 1104 with micro-cells patterned and a flat portion 1106 with no micro-cells. In practice, the substantially flat portion 1106 and the micro-cell portion 1104 may be patterned at the same photolithography step. In some embodiments, once the patterns have been defined, and after an embossing step, strips of release liners may be laminated on to the substantially flat portion, where the thickness of the release liner may be the same of the micro-cell height. It is preferred that the surface energy of the release liner to be sufficiently high such that the sealing layer will not de-wet on the top of the release liner, and in some embodiments, the surface energy may be tuned to a particular level depending on the application. The release liner in this case may include poly vinyl alcohol or other water soluble polymers. Furthermore, after a filing and sealing step, the release liner may be removed together with the ink and sealing layer on top of it to expose the flat area underneath. In practice, removing the release liners will remove the sealing layer/material and ink from the substantially flat portion of the EPD layer. This process can ensure a substantially clean break of the ink and sealing material from the micro-cell portion 1104. A piece of non-metalized piezo film may be laminated onto the flat. The total thickness of piezo film and adhesive layer may be similar to the total thickness of the sealing layer and the micro-cells. In addition, a piece of adhesive layer may be laminated onto the release liner and onto the full display panel. A in line humidification or off line chamber humidification step may be used to ensure good optical performance of the display. In practice, after the patterns have been defined in FIGS. 11A and 11B, the structure may be cut along the A'A' line to create displays.

In some embodiments, a method for producing a display as describe above may include producing a layer of electrophoretic display material having a first portion 1102 and a second portion 1100, the first portion 1102 having a plurality of micro-cells and the second portion 1100 being substantially flat. The method may further include providing a piezoelectric material, and aligning the piezoelectric material to the second portion of the electrophoretic display material such that the piezoelectric material substantially overlaps with the second portion. In some embodiments, the first 1102 and second 1100 portions of the electrophoretic material are produced using a single photolithography step. The method may further include placing the electrophoretic display material and the piezoelectric material onto a substrate, where the substrate may be flexible. In some embodiments, the method may further include providing a conductive electrode onto the substrate, and providing a barrier layer between the conductive electrode and the substrate. In some embodiments, after the producing a layer of electrophoretic display step, the method may further include providing a layer of release liner, where the release liner has a height that is substantially similar to that of the plurality of micro-cells.

Furthermore, another second electrode may be printed on top of the substrate as shown in FIG. 6. To connect the second electrode to the EPD material, conducive ink may be used to pattern conductive traces or lines. In some embodiments, the pattern may contain two portions. A first portion may be printed as small strips and a second portion may be a two pixel pattern. Where each pixel may be connected to one or two small stripes suing conductive ink. These patterns may then be subsequently aligned and laminated onto the above mentioned FPL with the piezoelectric film on top of the small stripes.

Figure 12A:
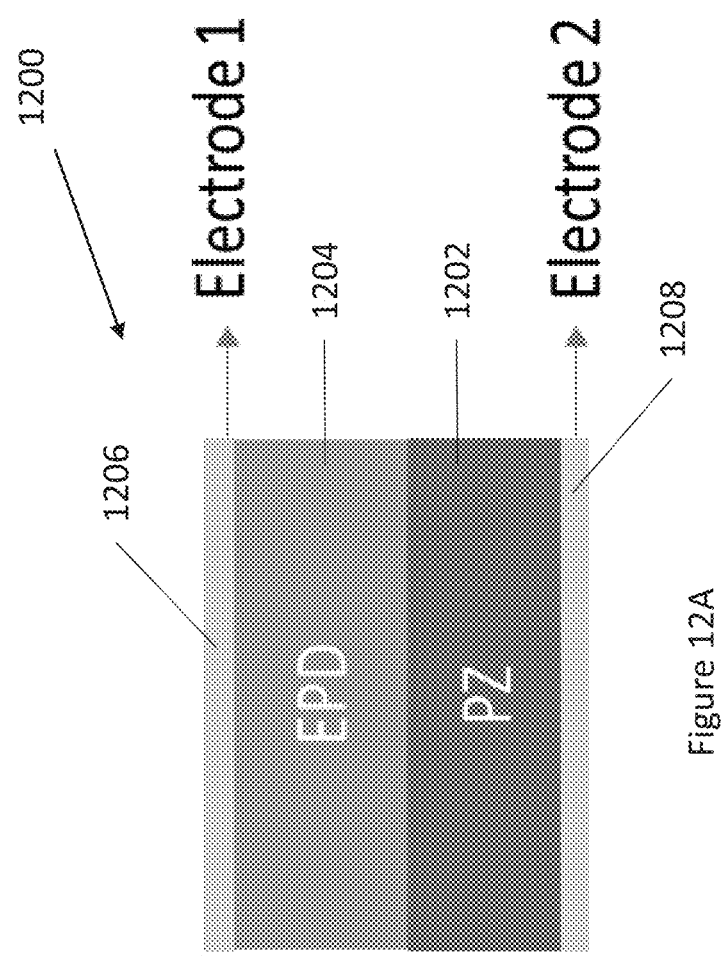
FIGS. 12A and 12B illustrate another embodiment of an electrophoretic display in accordance with the subject matter disclosed herein.
Figure 12B:
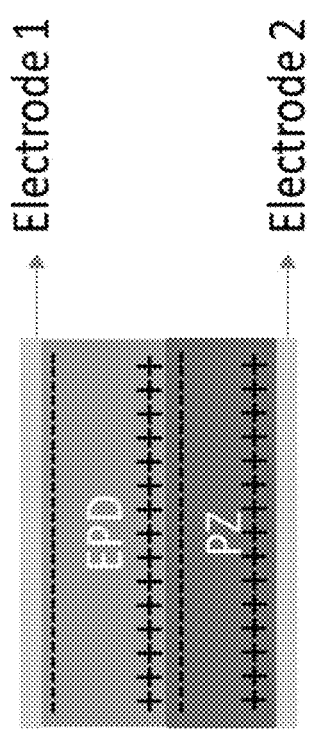

FIGS. 12A and 12B illustrate another embodiment of an electrophoretic display 1200 utilizing piezoelectric material. As shown, a piezoelectric material layer 1202 may be stacked with a display medium layer 1204 (e.g., an electrophoretic medium layer) to form a display. Two electrodes, electrode 1 1206 and electrode 2 1208 may be positioned on the two sides as shown in FIGS. 12A and 12B to sandwich the EPD layer 1204 and the piezoelectric material layer 1202 to complete a conductive path for the charges. In some embodiments, the electrode 2 1208 may be a metal on piezoelectric film or a laminated conductive adhesive on piezo film. In this configuration, no other connections is needed to drive the electrophoretic display material 1204.

In use, when a force is applied onto the piezoelectric material layer 1202, charge separation occurs within the piezoelectric material 1202. The charge on the interface of the electrophoretic display medium layer 1204 and the piezoelectric material layer 1202 can induce the charges on the EPD film and the electric field passes through the EPD to make the particles move. FIG. 12B illustrates a view of the charge distribution.

Figure 13A:
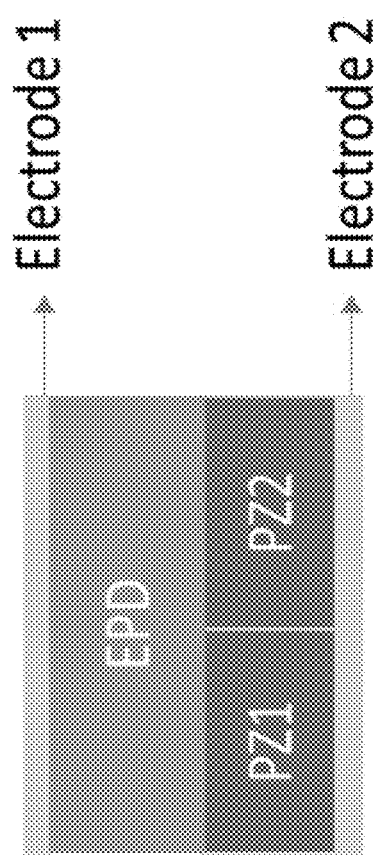
FIGS. 13A and 13B illustrate yet another embodiment of an electrophoretic display in accordance with the subject matter disclosed herein.
Figure 13B:
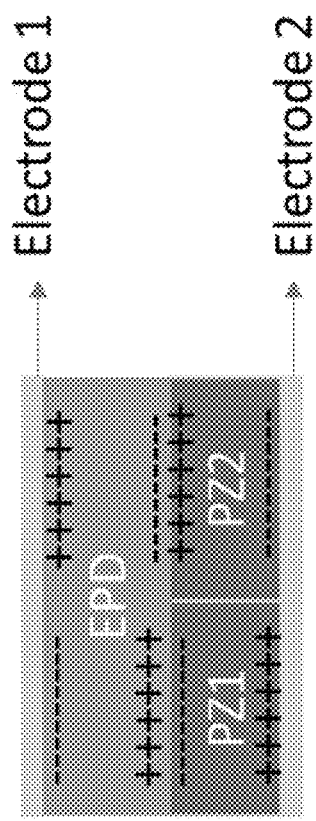

In yet another embodiment, to achieve an even better contrast ratio, piezo films with opposite poling directions may be positioned in a side by side configuration, as illustrated in FIGS. 13A and 13B. In use, PZ1 and PZ2 can produce opposite voltages under an applied force, FIG. 13B shows one embodiment of charge distribution when force is applied. It should be appreciated that all the layers presented herein in FIGS. 12A-13B, including the electrode 1 and electrode 2 layers may be transparent, such that this display may be viewed from either direction or orientation.

The embodiments shown in FIGS. 12A-13B not only reduces the overall device thickness to be less than 50 micro-meters, but also vastly improve the CR. It furthermore simplifies the device structure and makes the display device more sensitive to small strain changes.

Latent Images

Figure 14A:
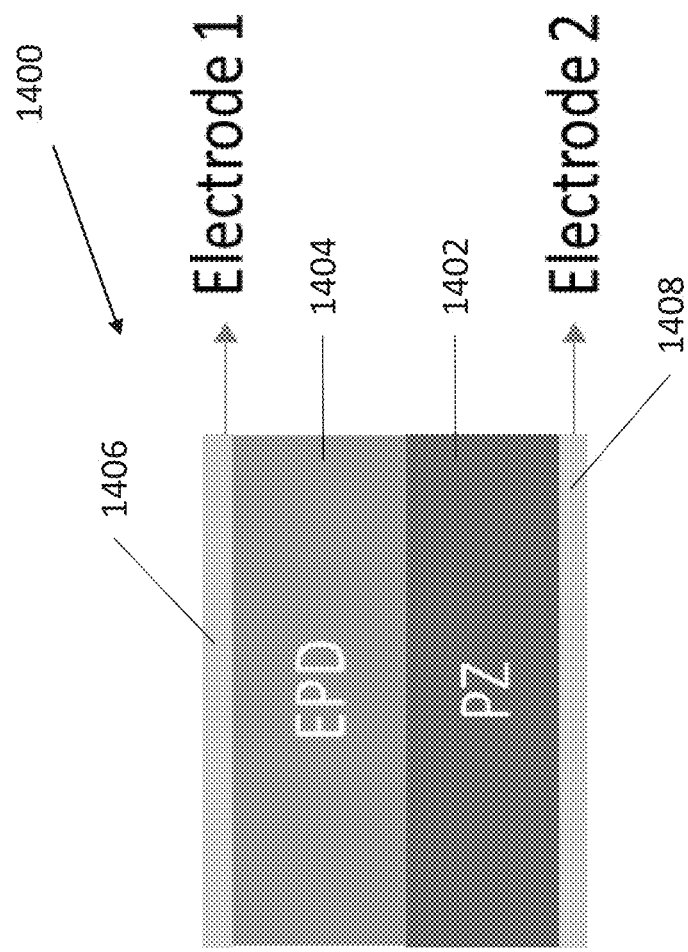
FIG. 14A illustrate an addition embodiment of an electrophoretic display with printed images or shapes in accordance with the subject matter disclosed herein.

In some embodiments, displays with structures that's similar to or based on the configurations illustrated in FIG. 12A or FIG. 1 may be modified to display latent images. Illustrated in FIG. 14A is a display device 1400 similar to the one presented in FIG. 12A, but with images or shapes laminated or printed onto either the electrode 1 1406 or electrode 2 1408. It should be appreciated that the configuration presented in FIG. 14A is for illustrating the concept as other configurations can be easily adopted to achieve the same effect. In practice, every layer of the display 1400 may be transparent (e.g., layers 1402, 1404, 1406, 1408 etc), even the adhesive layers and the electrodes 1 and 2 layers, such that this display can be viewed from either direction or orientation.

Figure 14B:
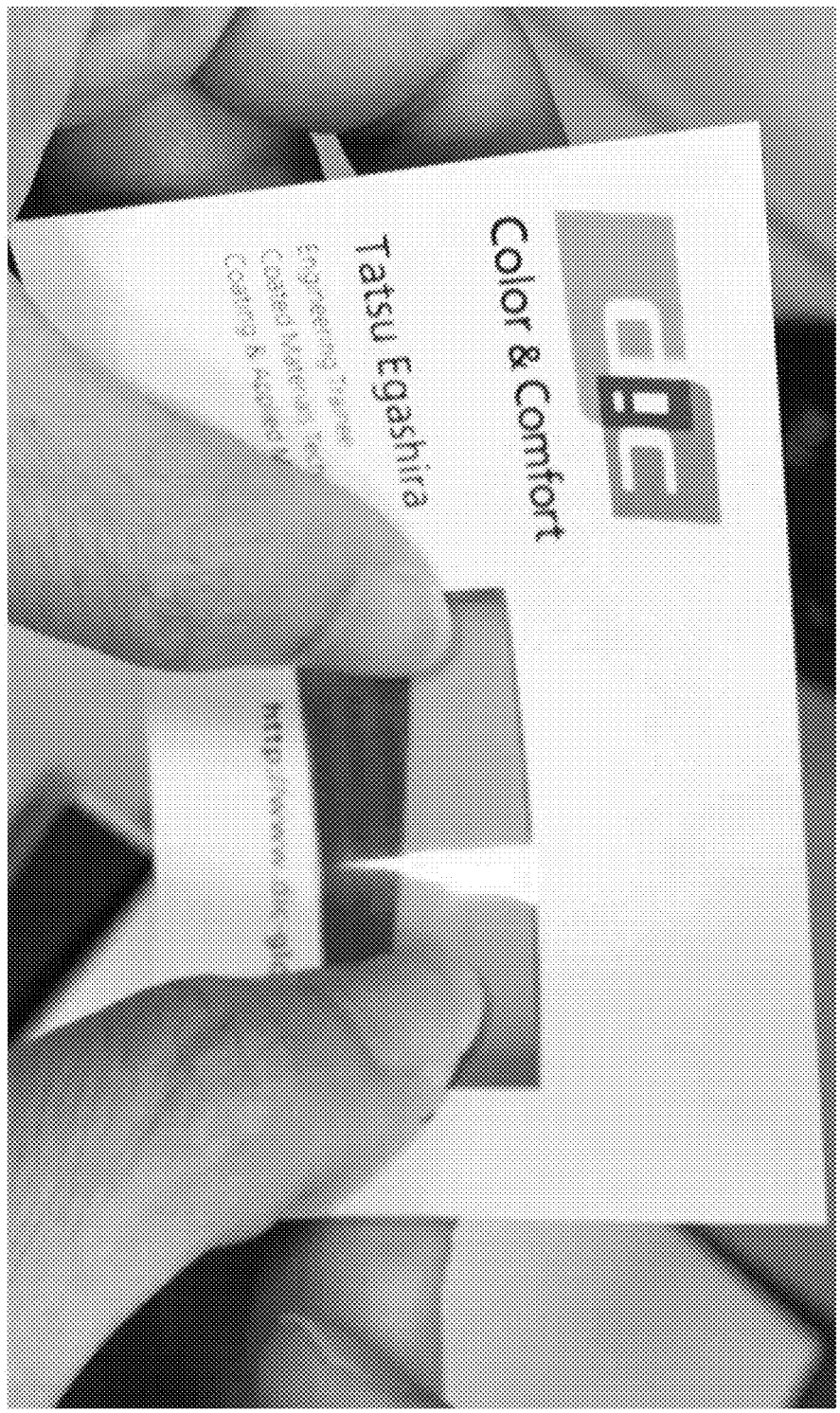
FIGS. 14B-14E illustrate the display of FIG. 14A in use in accordance with the subject matter disclosed herein.
Figure 14C:

In some embodiments, images or shapes may be printed or laminated onto a white background and onto either the electrode 1 1406 or electrode 2 1408, and viewed from an opposite side. In use, when the EPD layer 1404 is showing white color, the printed image or shape will be hidden (i.e., see FIG. 14B), and when the EPD 1404 switches to another color when force is applied, the printed image or shape may be displayed (i.e., see FIG. 14C).

Figure 14D:
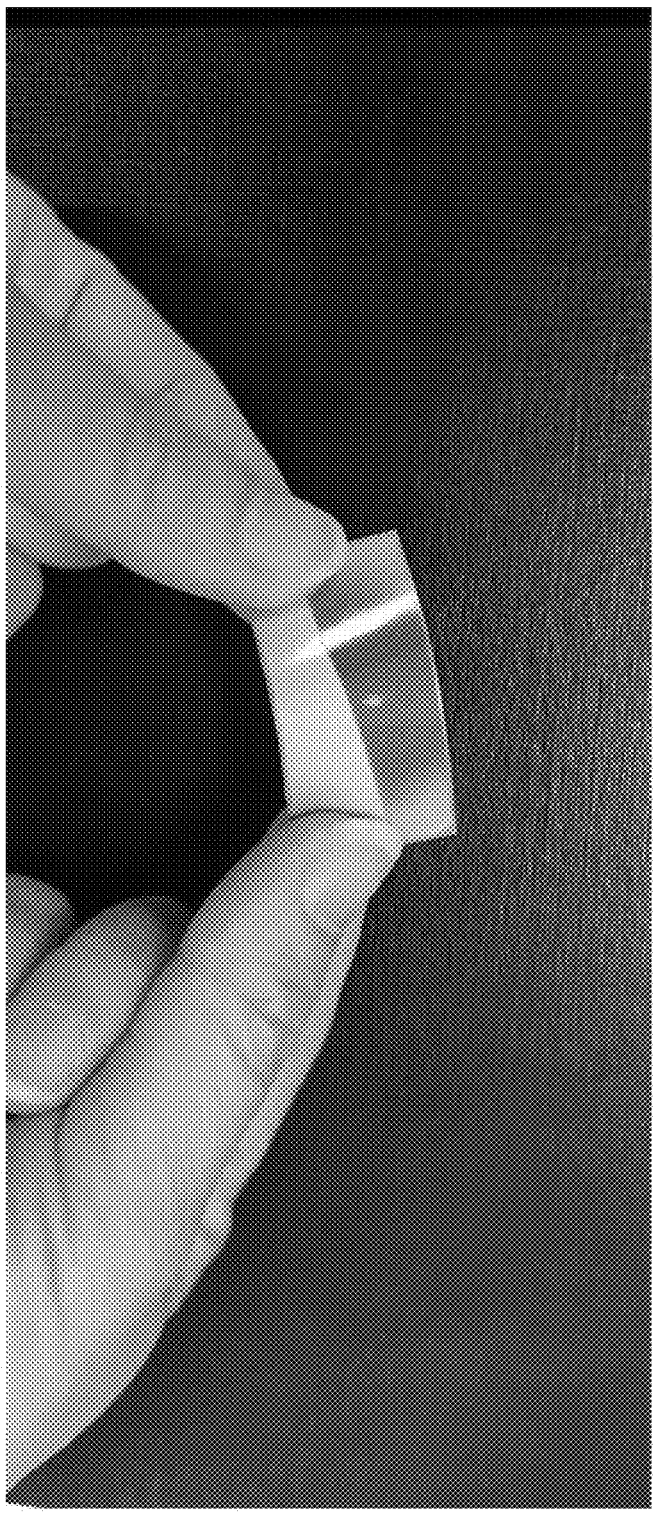
Figure 14E:
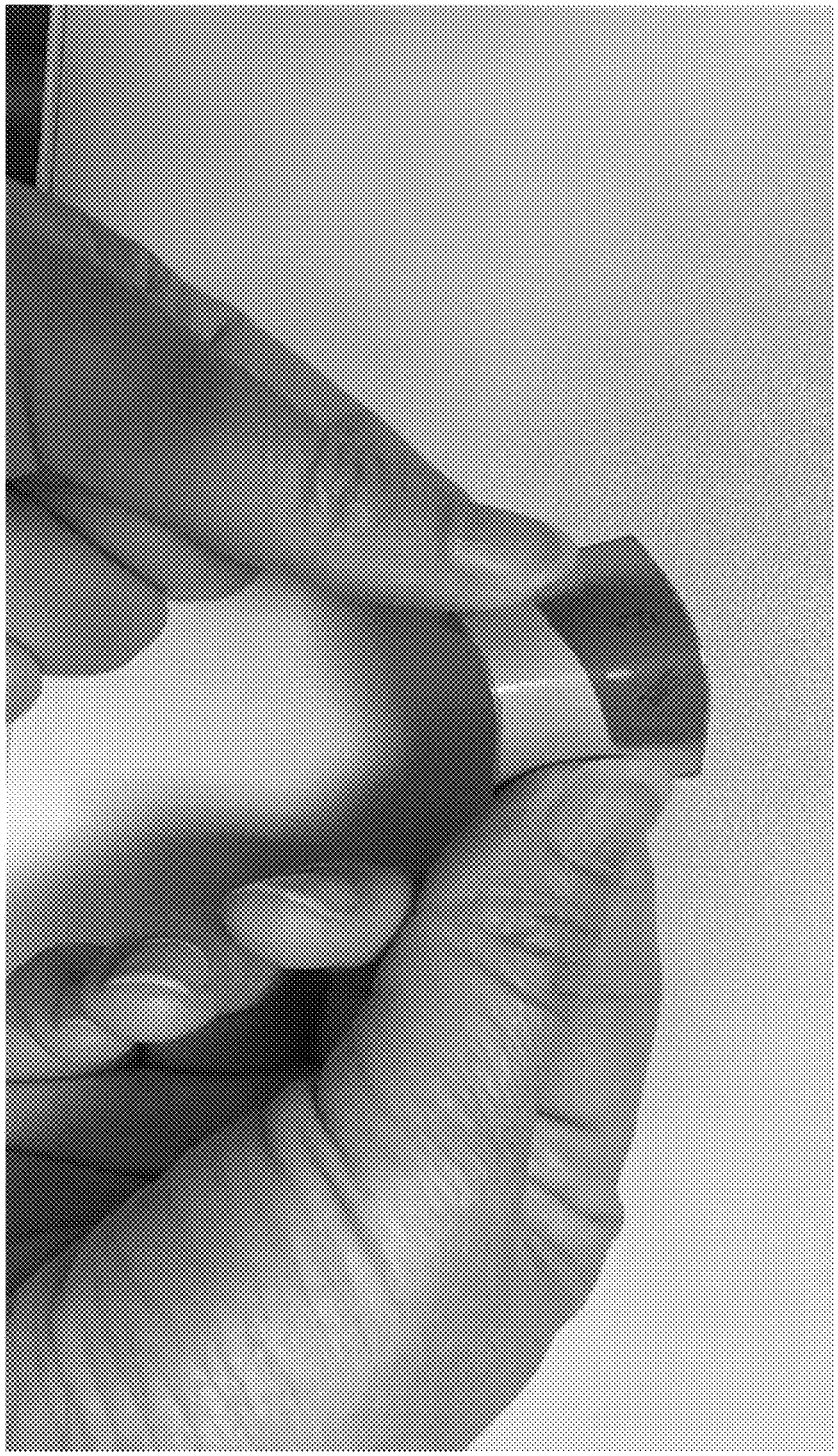

In yet another embodiment, dark colored images or shapes may be produced onto either electrode 1 1406 or electrode 2 1408 without a background and be viewed from an opposite side. In this configuration, when the display 1400 is position over a black background, as illustrated in FIG. 14D, the printed image or shape will remain hidden no matter how the EPD 1404 is bend. Alternatively, when the display 1400 is positioned over a white or light colored background, the printed image or shape will show up and it is more obvious when the EPD 1404 switches to a darker color, as illustrated in FIG. 14E.

Figure 15A:
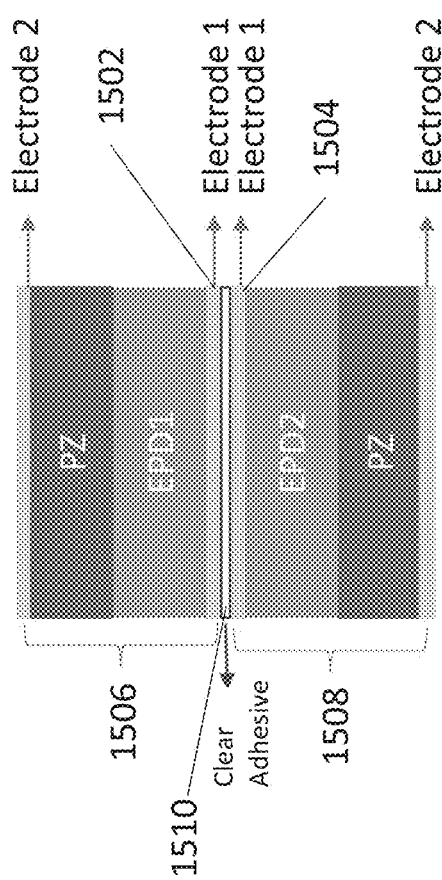
FIG. 15A illustrate yet another embodiment of an electrophoretic display with printed images or shapes in accordance with the subject matter disclosed herein.
Figure 15B:
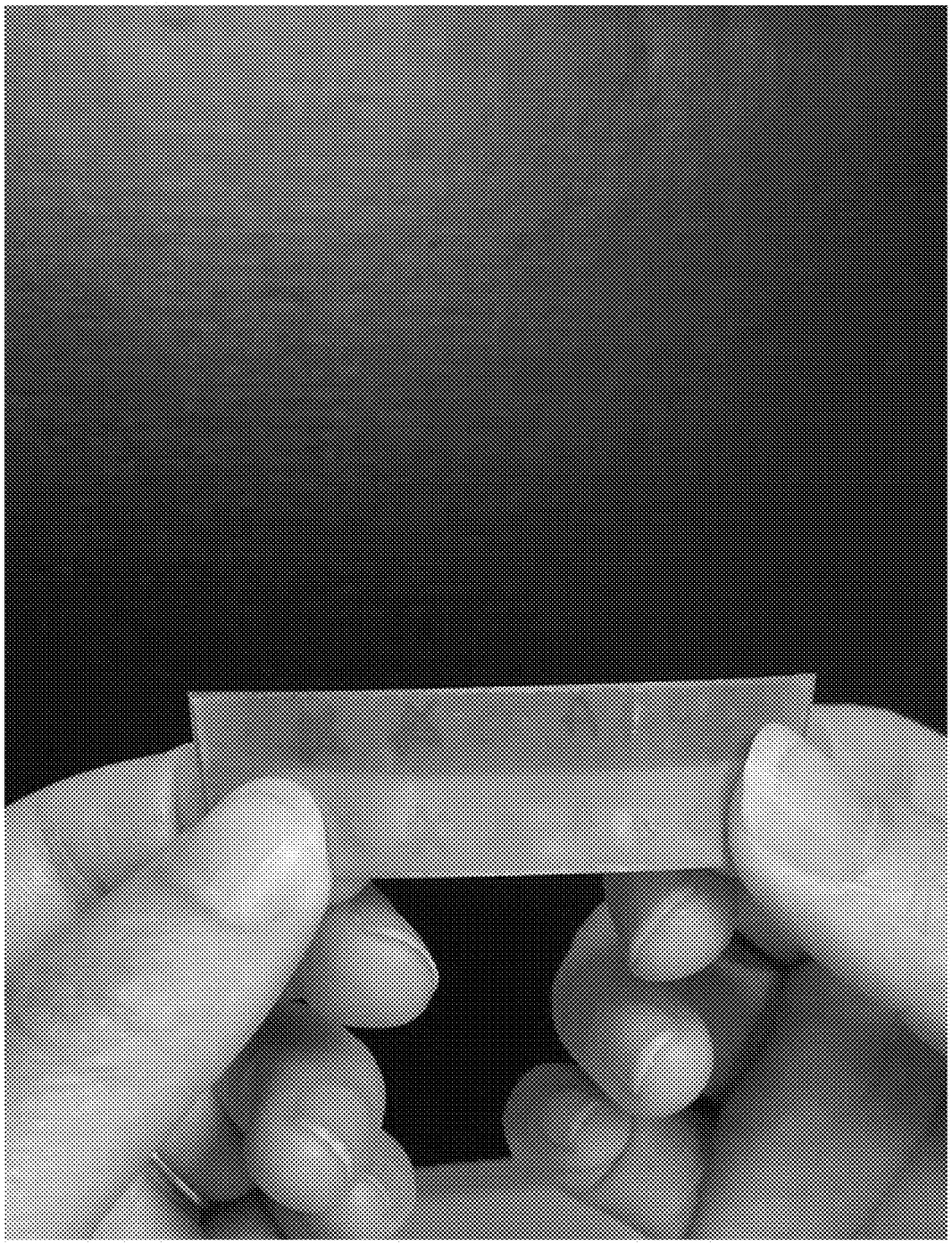
FIGS. 15B-15C illustrate the display of FIG. 15A in use in accordance with the subject matter disclosed herein.
Figure 15C:
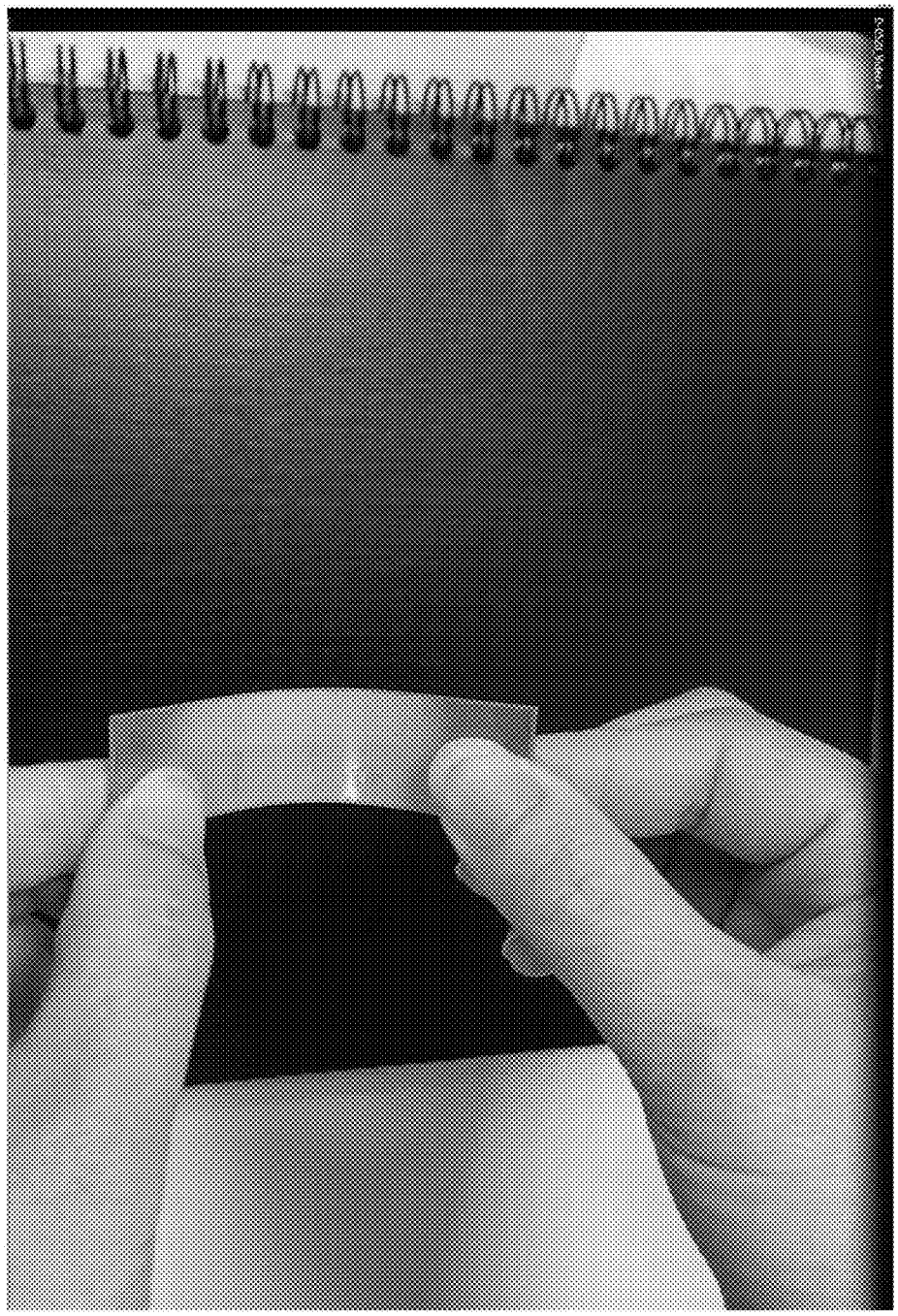

In yet another embodiment, as illustrated in FIG. 15A, images or shapes may be produced outside electrode 1s 1502, 1504 or either EPD display 1 1506 and EPD display 2 1508. The two EPD displays 1506, 1508 may be integrated together using a transparent adhesive material. When force is applied (e.g., bending), both EPD display 1 1506 and EPD display 2 1508 can change color. When EPD display 2 1508 turns dark and EPD display 1 1506 turns white, the printed image or shape will not show up, as illustrated in FIG. 15C. Alternatively, when EPD display 2 1508 turns white and EPD display 1 1506 turns dark, the printed image or shape will surface, as illustrated in FIG. 15B.

It should also be noted that, referring to the display configurations illustrated in FIGS. 9-14A, a conductive path is complete between the electrode 1 and electrode 2 and the piezoelectric material layer and the EPD film layer, no other conductor or electrodes is needed between the electrode 1 and electrode 2. And in the case of the display illustrated in FIG. 15, no additional conductor or electrode is needed for each of the stacked displays 1506 and 1508. This effectively reduces the overall thickness of the device, as well as improves the CR ratio of the display.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. An electro-optic display comprising:
a layer of electrophoretic material;
a first conductive layer;
a piezoelectric material positioned between the layer of electrophoretic material and the first conductive layer, wherein the piezoelectric material overlaps with only a first portion of the layer of electrophoretic material, while the first conductive layer overlaps with all the piezoelectric material and a second portion of the layer of electrophoretic material that does not overlap with the piezoelectric material, and wherein the first portion of the layer of electrophoretic material comprises a first plurality of micro-cells and has a first electrical resistance and the second portion of the layer of electrophoretic material comprises a second plurality of micro-cells and has a second electrical resistance; and
an adhesive layer positioned between the piezoelectric material and the layer of electrophoretic material, wherein the adhesive layer has a resistivity between $10^8$ Ohm*cm and $10^{12}$ Ohm*cm.

2. The electro-optic display of claim 1 further comprising a second conductive material positioned next to the layer of electrophoretic material and opposite from the piezoelectric material.

3. An electro-optic display comprising:
a layer of electrophoretic material;
a semi-conductive material having a resistivity of substantially $10^2$ to $10^{12}$ Ohm*cm; and
a piezoelectric material stacked with the semi-conductive material, wherein the piezoelectric material and the semi-conductive material are positioned side by side with the layer of electrophoretic material.

4. The electro-optic display of claim 3 further comprising a first conductive layer overlapping with the piezoelectric material and the electrophoretic material.

5. The electro-optic display of claim 4 further comprising a second layer of semi-conductive material between the first conductive layer and the piezoelectric material and the electrophoretic material.

6. The electro-optic display of claim 3 further comprising a second conductive layer overlapping with the semi-conductive material and the electrophoretic material.

7. An electro-optic display comprising:
a layer of electrophoretic material;
a first layer of piezoelectric material; and
a second layer of piezoelectric material, the first and second layers of piezoelectric material positioned side by side, wherein the first layer of piezoelectric material overlaps with only a first portion of the layer of electrophoretic material while the second layer of piezoelectric material overlaps with a second portion of the layer of electrophoretic material that does not overlap with the first layer of piezoelectric material, wherein the first and second layers of piezoelectric material have opposite poling directions.

8. A method for producing a display comprising:
producing a layer of electrophoretic display material having a first portion and a second portion, the first portion having a plurality of micro-cells and the second portion being substantially flat;
providing a piezoelectric material; and
aligning the piezoelectric material to the second portion of the electrophoretic display material such that the piezoelectric material substantially overlaps with the second portion and is positioned side by side with the plurality of micro-cells.

9. The method of claim 8, wherein the first and second portions of the electrophoretic material are produced using a single photolithography step.

10. The method of claim 8 further comprising placing the electrophoretic display material and the piezoelectric material onto a substrate.

11. The method of claim 10 wherein the substrate is flexible.

12. The method of claim 10 further comprising providing a conductive electrode onto the substrate.

13. The method of claim 12 further comprising providing a barrier layer between the conductive electrode and the substrate.

14. The method of claim 8 after the producing a layer of electrophoretic display step, further comprising providing a layer of release liner.

15. The method of claim 14 wherein the release liner has a height that is substantially similar to that of the plurality of micro-cells.

* * * * *